(12) United States Patent
Heo et al.

(10) Patent No.: US 12,269,535 B2
(45) Date of Patent: Apr. 8, 2025

(54) VEHICLE ROOF STRUCTURE

(71) Applicants: Hyundai Motor Company, Seoul (KR); Kia Corporation, Seoul (KR)

(72) Inventors: Chulhee Heo, Hwaseong-si (KR); Chan Woong Jeon, Incheon (KR); Haehoon Lee, Seoul (KR); Changhak Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 302 days.

(21) Appl. No.: 17/992,581

(22) Filed: Nov. 22, 2022

(65) Prior Publication Data

US 2023/0382464 A1 Nov. 30, 2023

(30) Foreign Application Priority Data

May 30, 2022 (KR) .................. 10-2022-0065897

(51) Int. Cl.
*B62D 25/06* (2006.01)
*B62D 27/06* (2006.01)
*B62D 29/00* (2006.01)

(52) U.S. Cl.
CPC .......... *B62D 25/06* (2013.01); *B62D 27/065* (2013.01); *B62D 29/001* (2013.01); *B62D 29/005* (2013.01)

(58) Field of Classification Search
CPC ..... B62D 25/06; B62D 29/001; B62D 29/043
USPC .................... 296/210, 211, 901.01
See application file for complete search history.

(56) References Cited

U.S. PATENT DOCUMENTS

| | | | |
|---|---|---|---|
| 7,690,552 B2* | 4/2010 | Gendou | B21J 15/025 228/112.1 |
| 8,944,496 B2* | 2/2015 | Hida | B62D 25/02 296/210 |
| 10,549,613 B2* | 2/2020 | Yoshizawa | B60J 7/043 |

* cited by examiner

*Primary Examiner* — Dennis H Pedder
(74) *Attorney, Agent, or Firm* — Slater Matsil, LLP

(57) ABSTRACT

An embodiment vehicle roof structure includes a front roof rail and a rear roof rail coupled to front and rear portions of side structures, respectively, the side structures being disposed along opposite sides of a vehicle body in a vehicle width direction, a center roof rail assembly disposed between the front roof rail and the rear roof rail and coupled to the side structures, a front roof panel including a first plastic composite material and coupled to the front roof rail, the center roof rail assembly, and the front portions of the side structures, a rear roof panel including a second plastic composite material and coupled to the rear roof rail, the center roof rail assembly, and the rear portions of the side structures, and a center roof panel including a steel material and coupled to the center roof rail assembly and center portions of the side structures.

20 Claims, 15 Drawing Sheets

VEHICLE ROOF STRUCTURE

CROSS-REFERENCE TO RELATED APPLICATIONS

This application claims the benefit of Korean Patent Application No. 10-2022-0065897, filed on May 30, 2022, which application is hereby incorporated herein by reference.

TECHNICAL FIELD

An embodiment of the present invention relates to a vehicle body of a vehicle, and more particularly, to a roof structure of a vehicle body for a purpose built vehicle (PBV).

BACKGROUND

Recently, the vehicle industry has been introducing a new concept of future mobility vision for realizing a human-centered and dynamic future city. One of these future mobility solutions is a PBV as a purpose-based mobility.

An example of the PBV may be an electric vehicle (EV)-based environmentally-friendly mobile vehicle. Such a PBV may set an optimal route for each situation by using artificial intelligence and unmanned autonomous driving, and may also conduct platoon driving.

The PBV may provide various customized services to users during a time it takes to travel on the ground to a destination in an unmanned autonomous driving method. For this purpose, the PBV is manufactured in a one box design with a large interior space.

In one example, a large area roof panel that is made of steel material and is press-formed through a press mold is applied to a roof body structure of the PBV in order to provide the large interior space to a user.

In order to form the large area roof panel made of the steel material, it is necessary to develop a large size press mold. However, a development period of the press mold is long, and investment costs such as development costs may also be excessive.

The above information disclosed in this background section is only for enhancement of understanding of the background of embodiments of the invention, and therefore it may contain information that does not form the prior art that is already known to a person of ordinary skill in the art.

SUMMARY

An embodiment of the present invention relates to a vehicle body of a vehicle. Particular embodiments relate to a roof structure of a vehicle body for a purpose built vehicle (PBV).

Embodiments of the present invention provide a vehicle roof structure that may reduce an investment cost and a development period of a press mold for manufacturing a roof panel assembly and may promote a scalability of service concept for a purpose built vehicle (PBV).

An embodiment of the present invention provides the vehicle roof structure that includes a front roof rail and a rear roof rail coupled to a front portion and a rear portion of side structures disposed along a vehicle width direction of a vehicle body, and including a center roof rail assembly that is disposed between the front roof rail and the rear roof rail and is coupled to the side structures, a front roof panel of a plastic composite material that is coupled to the front roof rail, the center roof rail assembly, and a front portion of the side structures, a rear roof panel of a plastic composite material that is coupled to the rear roof rail, the center roof rail assembly, and a rear portion of the side structures, and a center roof panel of a steel material that is coupled to the center roof rail assembly and a center portion of the side structures.

The center roof rail assembly may include a first center roof rail that is connected to each of roof sides of the side structures at a distance from the front roof rail corresponding to the first center roof rail in the vehicle width direction, a second center roof rail that is connected to each of the roof sides of the side structures at a distance from the rear roof rail corresponding to the second center roof rail in the vehicle width direction, and at least one third center roof rail that is connected to the first center roof rail and the second center roof rail in a vehicle body front-rear direction.

The center roof panel may include a first bonding part formed at a front end portion to be bonded to the first center roof rail and a second bonding part formed at a rear end portion to be bonded to the second center roof rail.

A front end portion of the front roof panel may be bonded to the front roof rail and a rear end portion of the front roof panel may be bonded to the first bonding part.

A front end portion of the rear roof panel may be bonded to the second bonding part and a rear end portion of the rear roof panel may be bonded to the rear roof rail.

Both edges along the vehicle width direction of the front roof panel and both edges along the vehicle width direction of the rear roof panel may be bonded to an outer surface of each of the roof sides.

The front roof panel may be coupled to the front roof rail and the first center roof rail by a bolt and a nut.

The rear roof panel may be coupled to the rear roof rail and the second center roof rail by a bolt and a nut.

Both edges along the vehicle width direction of the center roof panel may be bonded to an outer surface of each of the roof sides.

At least one space portion may be formed between each of the roof sides of the side structures and the at least one third center roof rail.

The center roof panel may include at least one opening portion connected to the at least one space portion.

The center roof panel may include a forming part formed downward along the vehicle body front-rear direction to be bonded to the at least one third center roof rail.

Both end portions of the first center roof rail may be connected to an upper portion of at least one door supporting pillar at the front portion of the side structures.

Both end portions of the second center roof rail may be connected to an upper portion of at least one door supporting pillar at the rear portion of both side structures.

The embodiments of the present invention may reduce the investment cost and the development period of the mold for manufacturing the roof panel assembly by configuring the roof panel assembly with the center roof panel of the steel material, the front roof panel of the plastic composite material, and the rear roof pane of the plastic composite material.

In addition, effects that may be obtained or expected from embodiments of the present invention are directly or suggestively described in the following detailed description. That is, various effects expected from embodiments of the present invention will be described in the following detailed description.

BRIEF DESCRIPTION OF THE DRAWINGS

These drawings are for reference only in describing embodiments of the present invention, and therefore, the technical idea of embodiments of the present invention should not be limited to the accompanying drawings.

Figure 1:
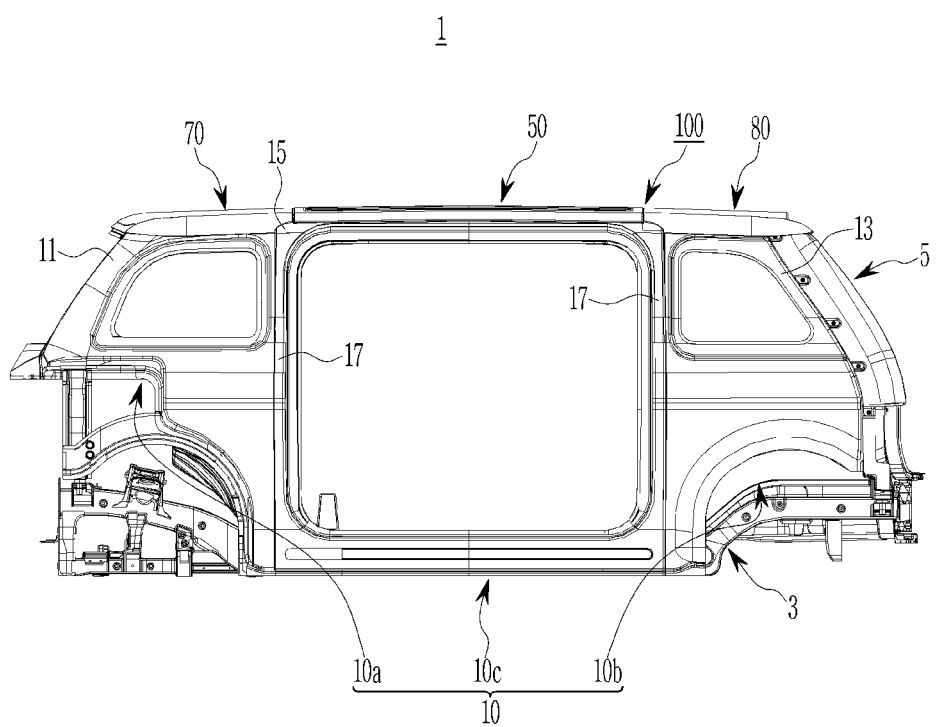
FIG. 1 is a side view showing a vehicle body to which a vehicle roof structure according to an embodiment of the present invention is applied.

It should be understood that the above-referenced drawings are not necessarily to scale, presenting a somewhat simplified representation of various preferred features illustrative of the basic principles of embodiments of the invention. The specific design features of embodiments of the present invention, including, for example, specific dimensions, orientations, locations, and shapes, will be determined in part by the particular intended application and use environment.

The following reference identifiers may be used in connection with the accompanying drawings to describe exemplary embodiments of the present disclosure.

| | |
|---|---|
| 1: vehicle body | 3: underbody |
| 5: upper body | 10: side structure |
| 10a: front portion | 10b: rear portion |
| 10c: center portion | 11: front pillar |
| 13: rear pillar | 15: roof side |
| 17: door supporting pillar | 20: roof rail unit |
| 21: front roof rail | 31: rear roof rail |
| 41: center roof rail assembly | 43: first center roof rail |
| 45: second center roof rail | 47: third center roof rail |
| 49: space portion | 50: center roof panel |
| 51: first part | 52: second part |
| 53: third part | 54: fourth part |
| 55: first bonding part | 57: second bonding part |
| 59: third bonding part | 61: sealer |
| 63: forming part | 65: opening portion |
| 70: front roof panel | 71: fourth bonding part |
| 73: fifth bonding part | 75: sixth bonding part |
| 77, 87: adhesive | 78, 88: bolt |
| 79, 89: nut | 80: rear roof panel |
| 81: seventh bonding part | 83: eighth bonding part |
| 85: ninth bonding part | 100: vehicle roof structure |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another by welding, self piercing rivets (SPRs), flow drill screws (FDSs), a structural adhesive, and the like or indirectly connected via one or more intermediary components.

It is understood that the term "vehicle," "vehicular," "car," or other similar term as used herein is inclusive of motor vehicles, in general, such as passenger automobiles including sport utility vehicles (SUVs), buses, trucks, various commercial vehicles, watercraft including a variety of boats and ships, aircraft, and the like, and includes hybrid vehicles, electric vehicles, hybrid electric vehicles, electric vehicle-based purpose built vehicles (PBVs), hydrogen-powered vehicles, and other alternative fuel vehicles (for example, fuels derived from resources other than petroleum).

Hereinafter, embodiments of the present invention will be described in detail with reference to the accompanying drawings.

FIG. 1 is a side view showing a vehicle body to which a vehicle roof structure according to an embodiment of the present invention is applied.

Figure 2:
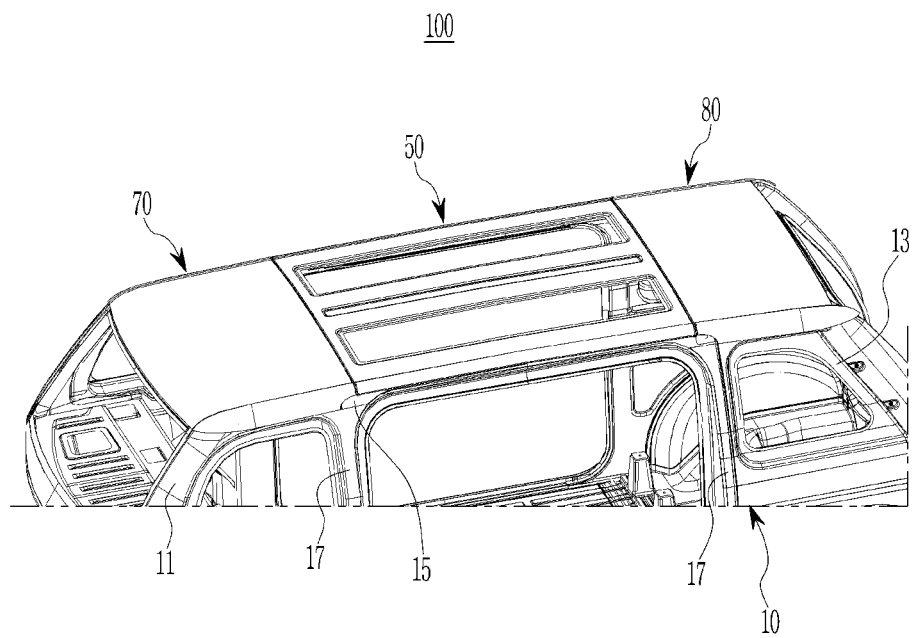
FIG. 2 is a combined perspective view of the vehicle roof structure according to an embodiment of the present invention.
Figure 3:
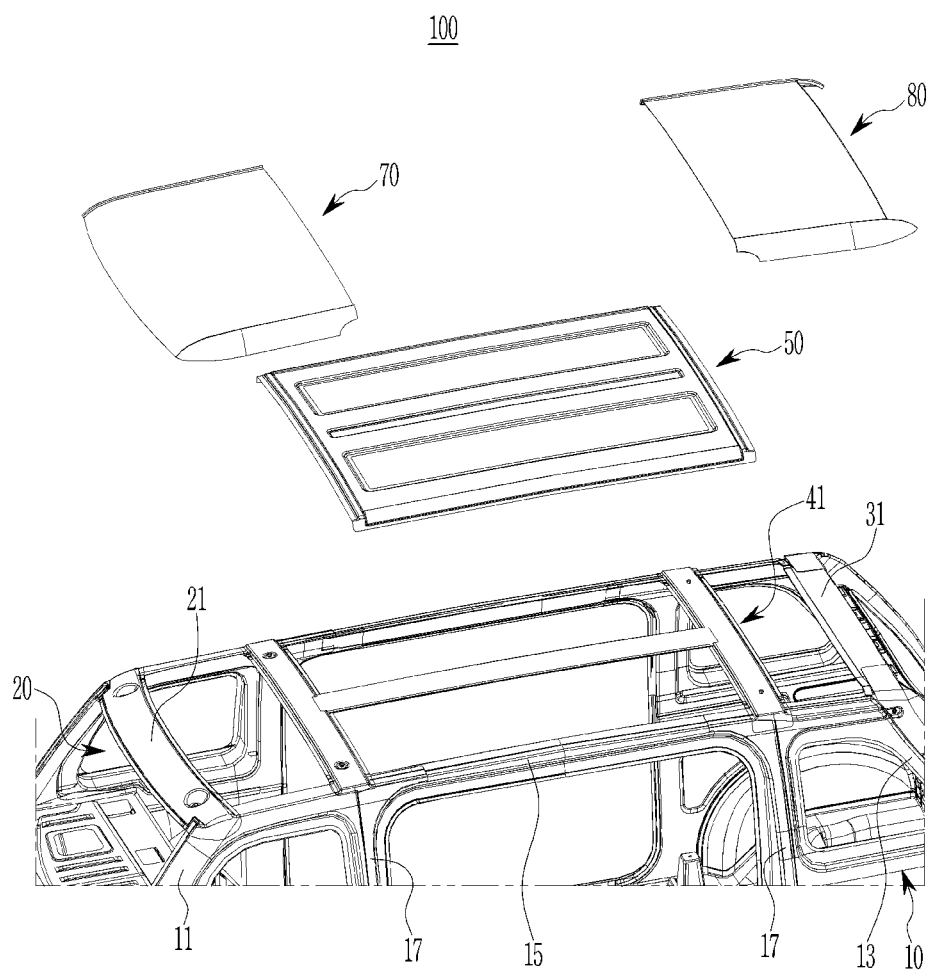
FIG. 3 is an exploded perspective view of the vehicle roof structure according to an embodiment of the present invention.

Referring to FIG. 1 to FIG. 3, the vehicle roof structure wo according to an embodiment of the present invention may be applied to, for example, a vehicle body 1 of a purpose built vehicle (hereinafter referred to as a 'PBV').

In one example, the PBV may be utilized as an electric vehicle-based life module vehicle that provides various services to an occupant during a time it takes to travel on the ground to a destination in an unmanned autonomous driving method. The life module vehicle is generally referred to as a robo-taxi, a robo-shuttle, or a hailing vehicle by those skilled in the art.

The PBV may be manufactured in a one box design with a large interior space. In addition, the PBV may apply a facing type seat to provide a spacious interior space.

The vehicle body 1 of the PBV includes a skateboard-type underbody 3 (it is also generally referred to as a rolling chassis or a chassis frame by those skilled in the art) and an upper body 5 assembled to the underbody 3.

A battery assembly (not shown) and a driving motor may be mounted on the underbody 3. In addition, the upper body 5 is a body-in-white (BIW) body coupled to the underbody 3, and may configure a cabin with a large interior space.

In the present specification, reference directions for describing the following constituent elements may be set in a vehicle body front-rear direction (for example, a vehicle body length direction or longitudinal direction), a vehicle width direction (for example, a lateral direction), and a vertical direction (for example, a height direction) based on the vehicle body 1.

In addition, in embodiments of the present specification, an 'upper end portion', 'upper portion', 'upper end', or 'upper surface' of a constituent element represents an end portion, a portion, an end, or a surface of the constituent element that is relatively higher in the drawing, and a 'lower end portion', a 'lower portion', a 'lower end', or a 'lower surface' of a constituent element represents an end portion, a portion, an end, or a surface of the constituent element that is relatively lower in the drawing.

In addition, in embodiments of the present specification, an end of a constituent element (for example, one end, the other end, both ends, or the like) represents an end of the constituent element in any one direction, and an end portion of a constituent element (for example, one end portion, the other end portion, both end portions, a front end portion, a rear end portion, or the like) represents a portion of the constituent element including the end.

On the other hand, the upper body 5 as described above includes side structures 10 provided at both sides in the vehicle width direction, respectively, and the roof structure 100 for the vehicle according to an embodiment of the present invention.

Each of the side structures 10 includes a front pillar 11, a rear pillar 13, a roof side 15, and at least one door supporting pillar 17.

The front pillar 11 and the rear pillar 13 are provided as pillars having relatively high rigidity in the vehicle body 1. The roof side 15 is connected to upper portions of the front pillar 11 and the rear pillar 13 along the front-rear direction of the vehicle body. In addition, the at least one door supporting pillar 17 is configured to support, in one example, a sliding door, and is connected to the roof side 15 along the vertical direction.

In embodiments of the present specification, each of the side structures 10 as described above may be divided into a front portion b0a, a rear portion 10b, and a center portion 10c along the vehicle body front-rear direction.

The vehicle roof structure 100 according to an embodiment of the present invention may be mounted on upper portions of the side structures 10. The vehicle roof structure 100 may include a large area roof panel assembly for providing a large interior space to a user in the PBV of the one box design.

On the other hand, the vehicle body 1 as described above may be divided into a front module and a rear module that are fixing parts and are commonly applied to various types of the PBV, and a center module that is a deformable part and is structurally deformed according to various service concepts. Here, each of the front module, the rear module, and the center module may be assembled with each other in a state of being separately manufactured.

The vehicle roof structure 100 according to an embodiment of the present invention is a structure that reduces an investment cost and a development period of a press mold for manufacturing the roof panel assembly and that promotes a scalability of service concept of the PBV.

FIG. 2 is a combined perspective view of the vehicle roof structure according to an embodiment of the present invention. FIG. 3 is an exploded perspective view of the vehicle roof structure according to an embodiment of the present invention.

Referring to FIG. 1 through FIG. 3, the vehicle roof structure 100 according to an embodiment of the present invention includes a roof rail unit 20 and a roof panel assembly including a center roof panel 50, a front roof panel 70, and a rear roof panel 80.

In an embodiment of the present invention, the roof rail unit 20 may be coupled to the roof panel assembly while supporting the roof panel assembly.

Figure 4:
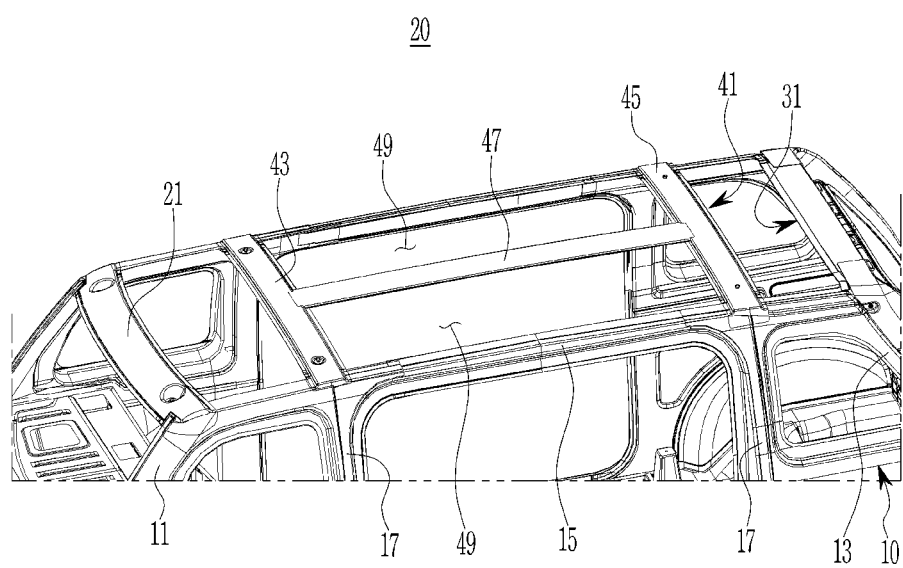
FIG. 4 is a perspective view showing a roof rail unit applied to the vehicle roof structure according to an embodiment of the present invention.

FIG. 4 is a perspective view showing a roof rail unit applied to the vehicle roof structure according to an embodiment of the present invention.

Referring to FIG. 1 through FIG. 4, the roof rail unit 20 according to an embodiment of the present invention includes a front roof rail 21, a rear roof rail 31, and a center roof rail assembly 41.

The front roof rail 21 is coupled to the front portion b0a of the side structures 10. The front roof rail 21 is connected to an upper portion of the front pillar 11 of each of the side structures 10 in the vehicle width direction. Both end portions of the front roof rail 21 may be bonded (e.g., welded) to the upper portion of the front pillar 11 through the roof side 15 of each of the side structures 10.

The rear roof rail 31 is coupled to the rear portion 10b of the side structures 10. The rear roof rail 31 is connected to an upper portion of the rear pillar 13 of each of the side structures 10 in the vehicle width direction. Both end portions of the rear roof rail 31 may be bonded (e.g., welded) to the upper portion of the rear pillar 13 through the roof side 15 of the side structures 10.

In an embodiment of the present invention, the center roof rail assembly 41 between the front roof rail 21 and the rear roof rail 31 is coupled to the center portion 10c of each of the side structures 10.

The center roof rail assembly 41 includes a first center roof rail 43, a second center roof rail 45, and at least one third center roof rail 47.

The first center roof rail 43 is connected to the roof side 15 of the side structures 10 at a predetermined distance from the front roof rail 21 corresponding to the first center roof rail in the vehicle width direction (e.g., the lateral direction). Both end portions of the first center roof rail 43 may be bonded (e.g., welded) to respective roof sides 15.

In one example, both end portions of the first center roof rail 43 may be connected to an upper portion of the at least one door supporting pillar 17 at the front portion b0a of each of the side structures 10.

The second center roof rail 45 is connected to respective roof sides 15 of the side structures 10 at a predetermined distance from the rear roof rail 31 corresponding to the second center roof rail in the vehicle width direction (e.g., the lateral direction).

In one example, both end portions of the second center roof rail 45 may be connected to the upper portion of the at least one door supporting pillar 17 at the rear portion 10b of each of the side structures 10.

In addition, the at least one third center roof rail 47 is disposed between the first center roof rail 43 and the second center roof rail 45. The at least one third center roof rail 47 is connected to the first center roof rail 43 and the second center roof rail 45 in the vehicle body front-rear direction (e.g., the longitudinal direction).

In one example, the at least one third center roof rail 47 may be provided as a single spine type disposed along the vehicle body front-rear direction. In addition, both end portions of the at least one third center roof rail 47 may be bonded (e.g., welded) to the first center roof rail 43 and the second center roof rail 45.

Here, at least one space portion 49 may be formed between respective roof sides 15 of the side structures 10 and the at least one third center roof rail 47. The at least one space portion 49 may be formed at both sides along the vehicle width direction with the at least one third center roof rail 47 interposed therebetween.

Referring to FIG. 1 through FIG. 4, in an embodiment of the present invention, the center roof panel 50 may be provided in the center module that is the deformable part of the vehicle body 1 mentioned above.

That is, the center roof panel 50 is not easily recognized by the user in the vehicle body 1 of the PBV and may be provided in the center module that is structurally deformed according to the various service concepts.

Accordingly, the center roof panel 50 may be transformed into various sizes and shapes according to the various service concepts of the PBV.

Furthermore, the center roof panel 50 supports a weight (e.g., a roof air conditioner, etc.) mounted in an interior of the PBV and is a part that is not easily recognized by the user so that it is provided with a steel plate. The center roof panel 50 of the steel material may be press molded into a predetermined shape by a press mold known to those skilled in the art.

The center roof panel 50 of the steel material according to an embodiment of the present invention is coupled to the center roof rail assembly 41 and the center portion 10c of each of the side structures 10 in the vehicle body 1.

FIG. 5 through FIG. 9B are views view showing a coupling structure of the center roof panel applied to the vehicle roof structure according to an embodiment of the present invention.

Referring to FIG. 1 through FIG. 5, the center roof panel 50 according to an embodiment of the present invention includes a first part (or a first portion) 51, a second part 52, a third part 53, and at least one fourth part 54 connected to each other.

The first part 51 is disposed along the vehicle width direction at a front portion of the center roof panel 50 and is bonded (e.g., welded) to the first center roof rail 43 of the center roof rail assembly 41.

The second part 52 is disposed along the vehicle width direction at a rear portion of the center roof panel 50 and is bonded (e.g., welded) to the second center roof rail 45 of the center roof rail assembly 41.

Each of the third parts 53 is disposed along the vehicle body front-rear direction at both edges along the vehicle width direction of the center roof panel 50 and is coupled (e.g., welded) to both end portions of the first part 51 and both end portions of the second part 52. Each third part 53 is bonded (e.g., welded) to each roof side 15 of the side structures 10.

Further, the at least one fourth part 54 is disposed between the first part 51 and the second part 52 and between the third parts 53 along the vehicle body front-rear direction. The at least one fourth part 54 is coupled (e.g., welded) to the first part 51 and the second part 52. The at least one fourth part 54 is bonded (e.g., welded or glued) to an upper surface of the at least one third center roof rail 47 of the center roof rail assembly 41.

Figure 6A:
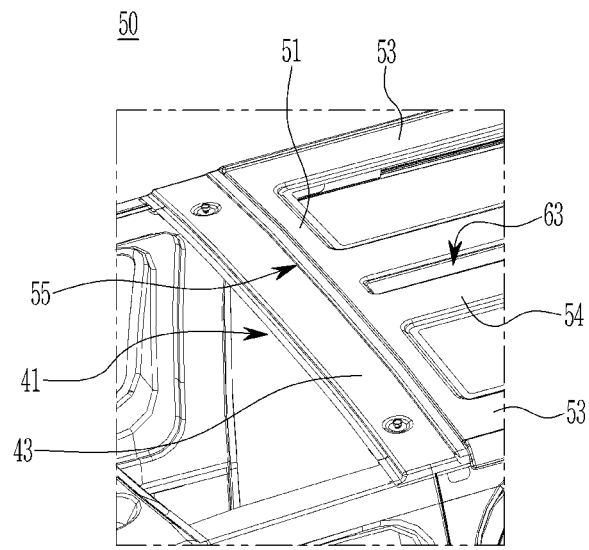
Figure 7A:
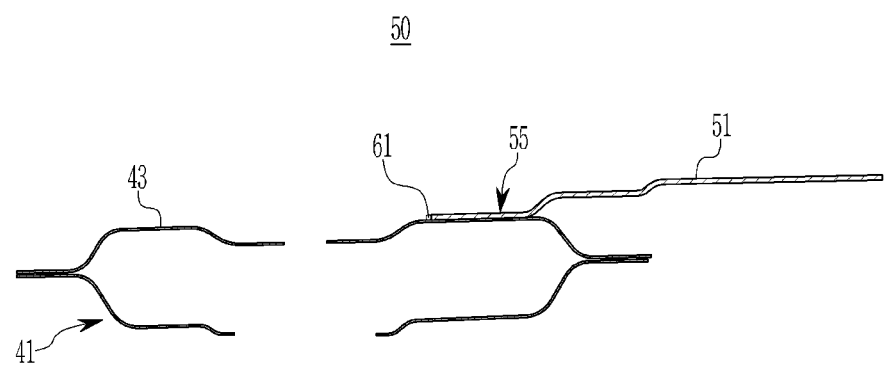

As shown in FIG. 6A and FIG. 7A, in the center roof panel 50, the first part 51 includes a first bonding part 55 bonded to an upper surface of the first center roof rail 43. The first bonding part 55 is formed at a front end portion of the first part 51 and is bonded (e.g., welded) to the upper surface of the first center roof rail 43 along the vehicle width direction.

Figure 6B:
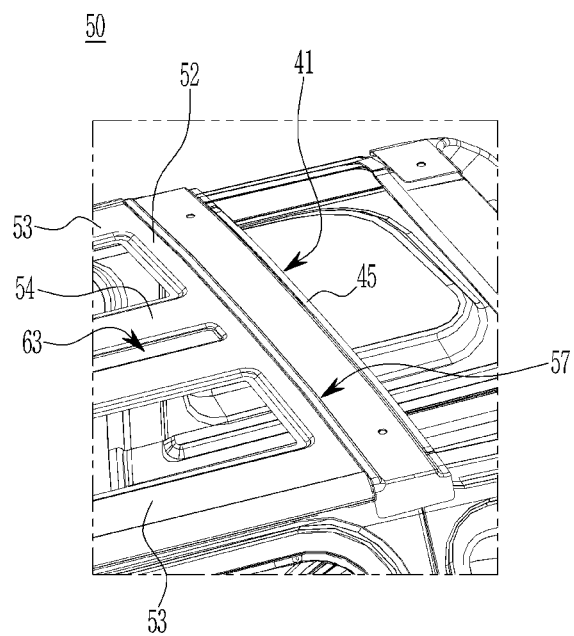
Figure 7B:
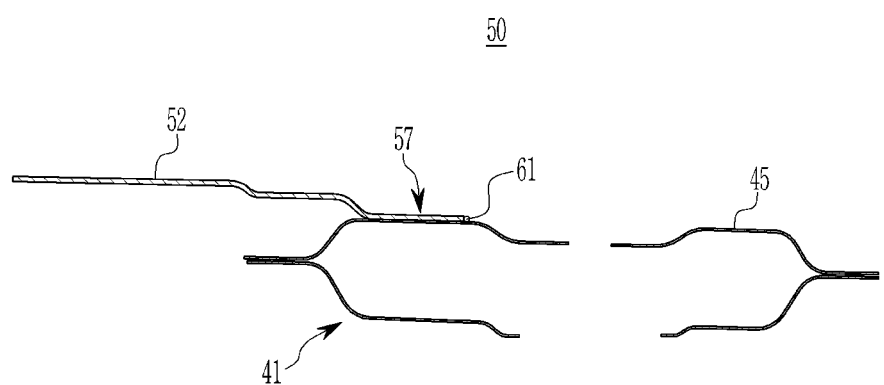

Further, as shown in FIG. 6B and FIG. 7B, in the center roof panel 50, the second part 52 includes a second bonding part 57 bonded to an upper surface of the second center roof rail 45. The second bonding part 57 is formed at a rear end portion of the second part 52 and is bonded (e.g., welded) to the upper surface of the second center roof rail 45 along the vehicle width direction.

Here, a sealer 61 known to those skilled in the art may be applied between the front end portion of the first part 51 and the upper surface of the first center roof rail 43 bonded together and between the rear end portion of the second part 52 and the upper surface of the second center roof rail 45.

Figure 8A:
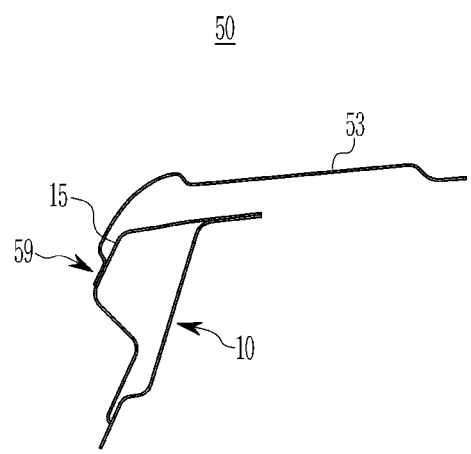
Figure 8B:
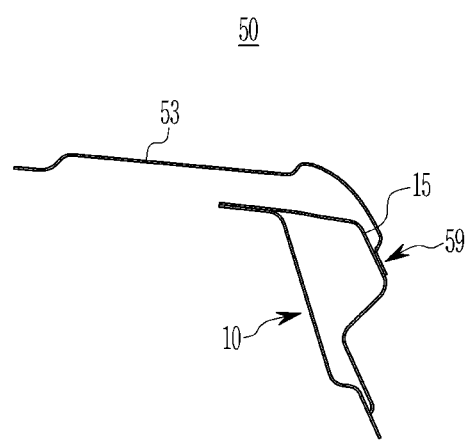

Further, as shown in FIGS. 8A and 8B, in the center roof panel 50, each of the third parts 53 includes a third bonding part 59 bonded to each roof side 15 of the side structures 10. The third bonding part 59 may be formed at an outer edge of the third part 53 and may be bonded (e.g., welded) to an outer surface of each roof side 15.

Figure 9:
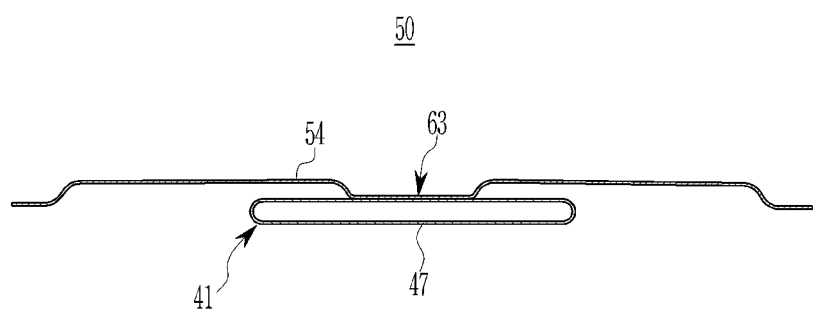
Figure 10:
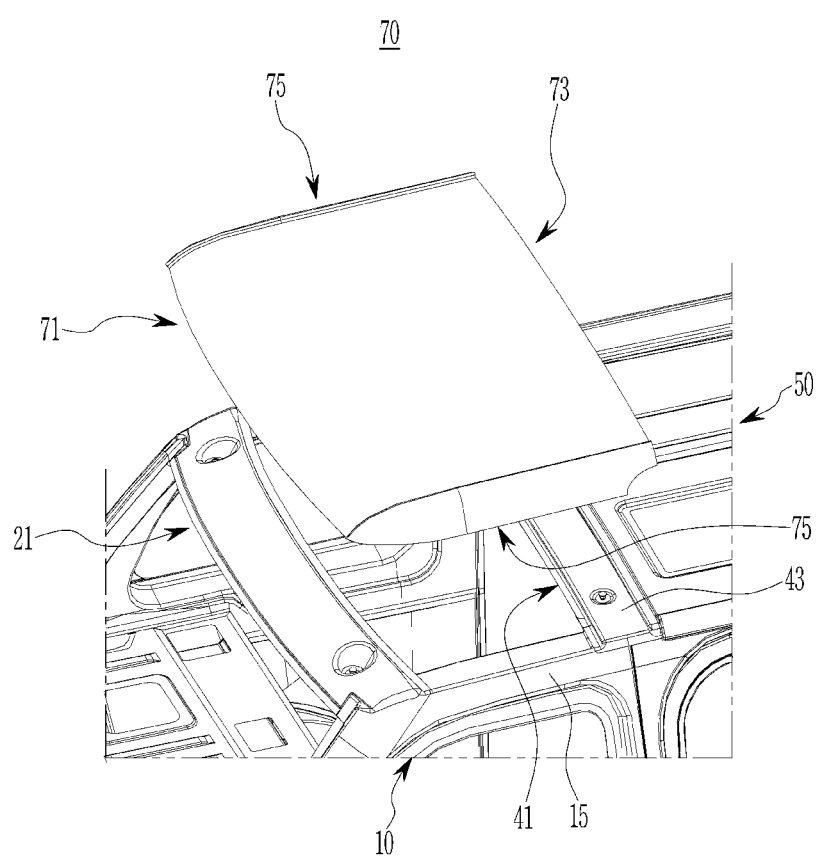
FIG. 10 through FIG. 12B are views showing a coupling structure of a front roof panel applied to the vehicle roof structure according to an embodiment of the present invention.

Further, as shown in FIG. 9, in the center roof panel 50, the fourth part 54 includes a forming part 63 bonded to the upper surface of the at least one third center roof rail 47. The forming part 63 is configured to substantially reinforce rigidity (or strength) along the vehicle body front-rear direction and the vehicle width direction of the center roof panel 50.

The forming part 63 is provided in a form of a groove formed downward along the vehicle body front-rear direction so as to be bonded to the upper surface of the at least one third center roof rail 47. The forming part 63 may be bonded (e.g., welded or glued) to the upper surface of the at least one third center roof rail 47 along the vehicle body front-rear direction.

Figure 5:
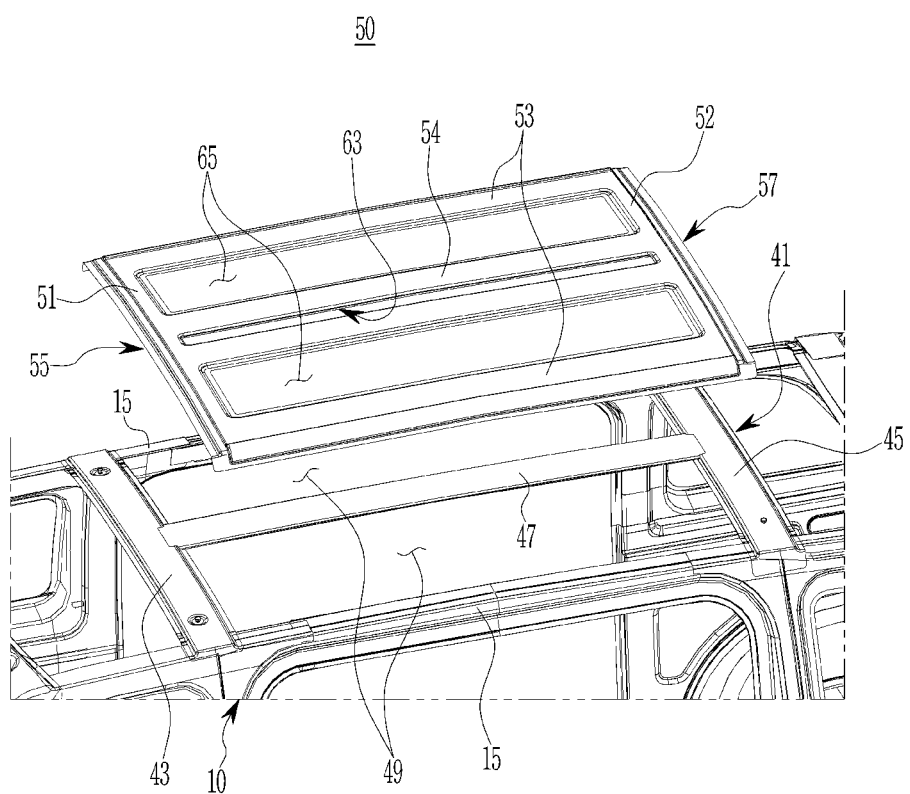
FIG. 5 through FIG. 9 are views showing a coupling structure of a center roof panel applied to the vehicle roof structure according to an embodiment of the present invention.

On the other hand, as shown in FIG. 5, the center roof panel 50 configured as above includes at least one opening portion 65 connected to the at least one space portion 49 mentioned above.

Here, a roof glass (not shown) for providing the user with a sense of openness of the interior of the PBV may be mounted in the at least one opening portion 65.

Referring to FIG. 1 through FIG. 3, in an embodiment of the present invention, the front roof panel 70 may be provided in the front module that is the fixing part of the vehicle body 1 as mentioned above. That is, the front roof panel 70 may be provided in the front module that is easily recognized by the user in the vehicle body 1 of the PBV.

Accordingly, the front roof panel 70 may be made of a plastic composite material having various colors. The front roof panel 70 of the plastic composite material may be molded in a predetermined shape by a composite material molding equipment known to those skilled in the art. The plastic composite material is advantageous for small volume production, may reduce equipment investment cost, may shorten an equipment development period, and has a merit that it may reduce a weight of the vehicle body 1.

The front roof panel 70 of the plastic composite material according to an embodiment of the present invention is coupled to the front roof rail 21, the center roof rail assembly 41, and the front portion boa of each of the side structures 10.

FIG. 10 through FIG. 12B are views showing a coupling structure of the front roof panel applied to the vehicle roof structure according to an embodiment of the present invention.

Referring to FIG. 10 through FIG. 12B, the front roof panel 70 according to an embodiment of the present invention may be bonded to the front roof rail 21, the first center roof rail 43 of the center roof rail assembly 41, and each roof side 15 of the side structures 10 in an adhesive manner and in a mechanical manner.

The front roof panel 70 includes a fourth bonding part 71, a fifth bonding part 73, and a sixth bonding part 75.

Figure 11A:
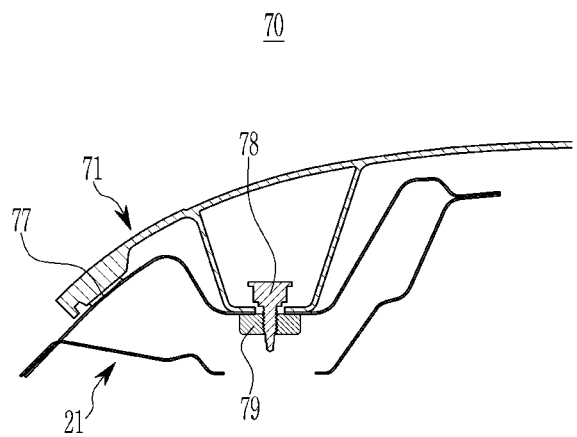

The fourth bonding part 71 is formed at a front end portion of the front roof panel 70 along the vehicle width direction. As shown in FIG. 11A, the fourth bonding part 71 may be bonded to an upper surface of the front roof rail 21 along the vehicle width direction through an adhesive 77.

Figure 11B:
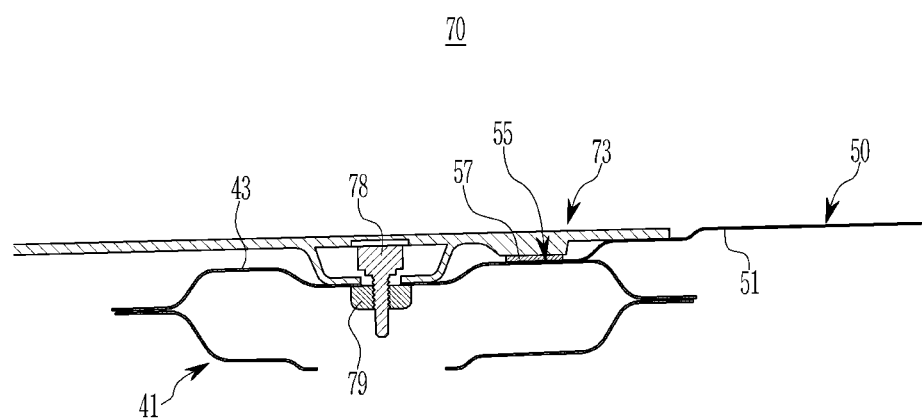

The fifth bonding part 73 is formed at a rear end portion of the front roof panel 70 along the vehicle width direction. As shown in FIG. 11B, the fifth bonding part 73 may be bonded to the first bonding part 55 of the first part 51 of the center roof panel 50 bonded to the upper surface of the first center roof rail 43 along the vehicle width direction through the adhesive 77.

Further, each of the sixth bonding parts 75 is formed at both edges along the vehicle width direction of the front roof panel 70 along the vehicle body front-rear direction.

Figure 12A:
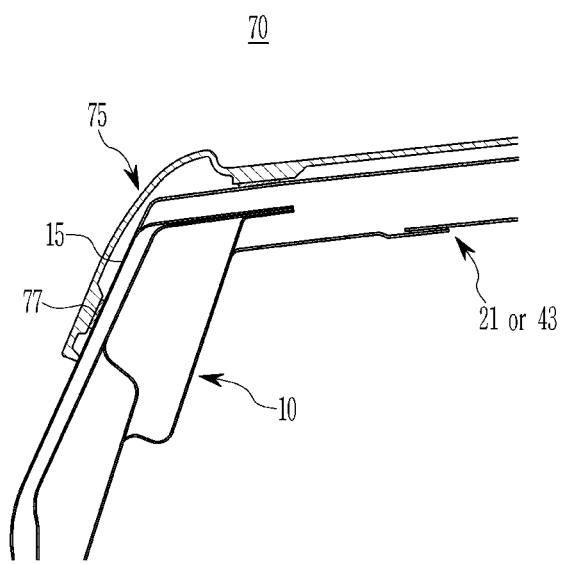
Figure 12B:
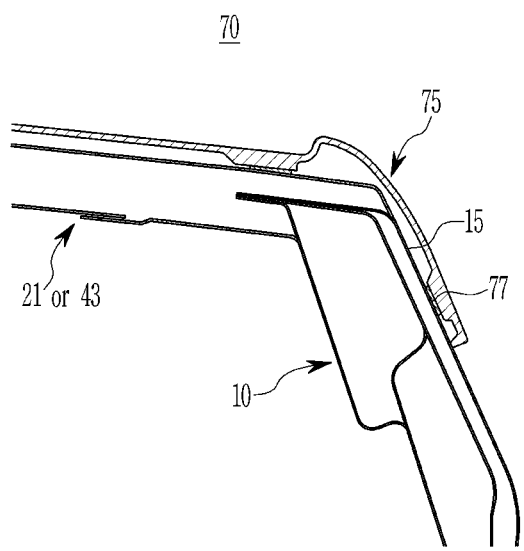
Figure 13:
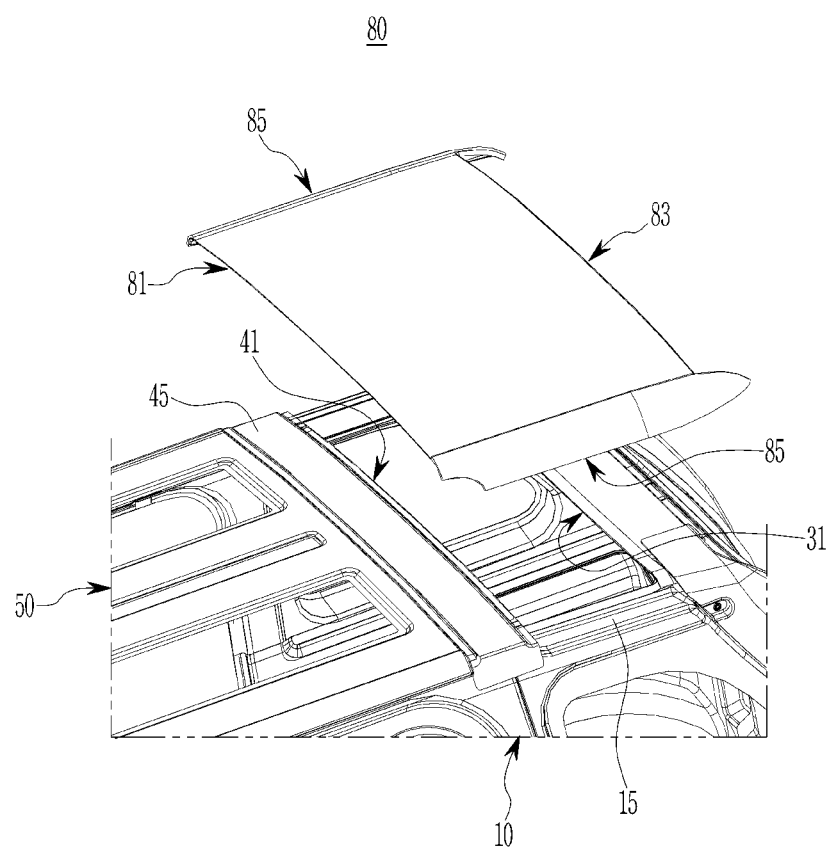
FIG. 13 through FIG. 15B are views showing a coupling structure of a rear roof panel applied to the vehicle roof structure according to an embodiment of the present invention.

As shown in FIGS. 12A and 12B, the sixth bonding part 75 may be bonded to each roof side 15 of the side structures 10. Furthermore, the sixth bonding part 75 may be bonded to the outer surface of each roof side 15 along the vehicle body front-rear direction through the adhesive 77.

Further, as shown in FIG. 11A, the front roof panel 70 of the plastic composite material as described above is engaged at the front roof rail 21 by a bolt 78 and a nut 79 in a mechanical bonding method.

Further, as shown in FIG. 11B, the front roof panel 70 of the plastic composite material is engaged at the first center roof rail 43 by the bolt 78 and the nut 79 in the mechanical bonding method.

Referring to FIG. 1 through FIG. 3, in an embodiment of the present invention, the rear roof panel 80 may be provided in the rear module that is the fixing part of the vehicle body 1 as mentioned above. That is, the rear roof panel 80 may be provided in the rear module that is easily recognized by the user in the vehicle body 1 of the PBV.

Accordingly, the rear roof panel 80 may be made of the plastic composite material having the various colors. The rear roof panel 80 of the plastic composite material may be molded in a predetermined shape by the composite material molding equipment known to those skilled in the art.

The rear roof panel 80 of the plastic composite material according to an embodiment of the present invention is coupled to the rear roof rail 31, the center roof rail assembly 41, and the rear portion 10b of each of the side structures 10.

FIG. 13 through FIG. 15B are views showing a coupling structure of the rear roof panel applied to the vehicle roof structure according to an embodiment of the present invention.

Referring to FIG. 13 through FIG. 15B, the rear roof panel 80 according to an embodiment of the present invention may be bonded to the rear roof rail 31, the second center roof rail 45 of the center roof rail assembly 41, and each roof side 15 of the side structures 10 in an adhesive manner and in a mechanical manner.

The rear roof panel 80 includes a seventh bonding part 81, an eighth bonding part 83, and a ninth bonding part 85.

Figure 14A:
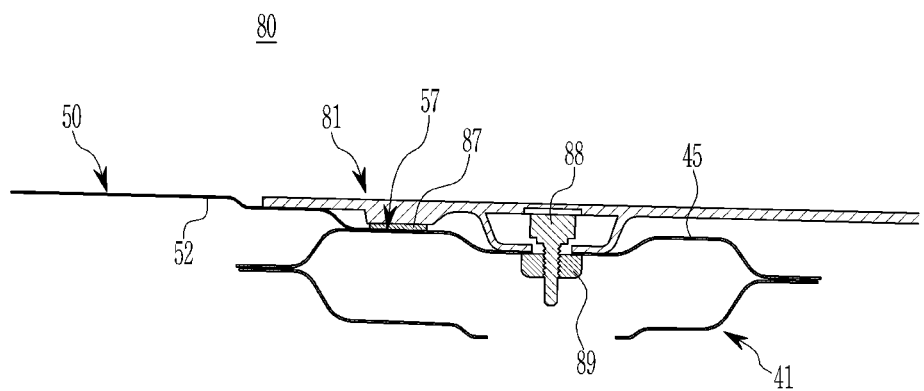

The seventh bonding part 81 is formed at a front end portion of the rear roof panel 80 along the vehicle width direction. As shown in FIG. 14A, the seventh bonding part 81 may be bonded to the second bonding part 57 of the second part 52 of the center roof panel 50 bonded to the upper surface of the second center roof rail 45 along the vehicle width direction through an adhesive 87.

Figure 14B:
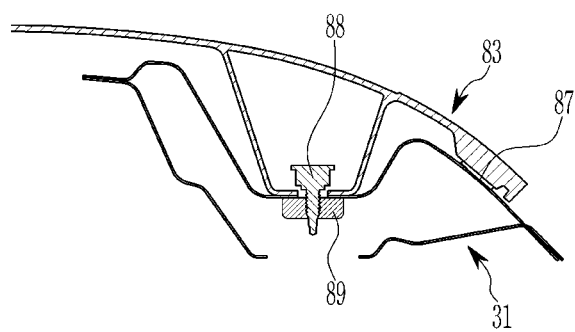

The eighth bonding part 83 is formed at a rear end portion of the rear roof panel 80 along the vehicle width direction. As shown in FIG. 14B, the eighth bonding part 83 may be bonded to an upper surface of the rear roof rail 31 along the vehicle width direction through the adhesive 87.

Further, the ninth bonding part 85 is formed at both edges along the vehicle width direction of the rear roof panel 80 along the vehicle body front-rear direction.

Figure 15A:
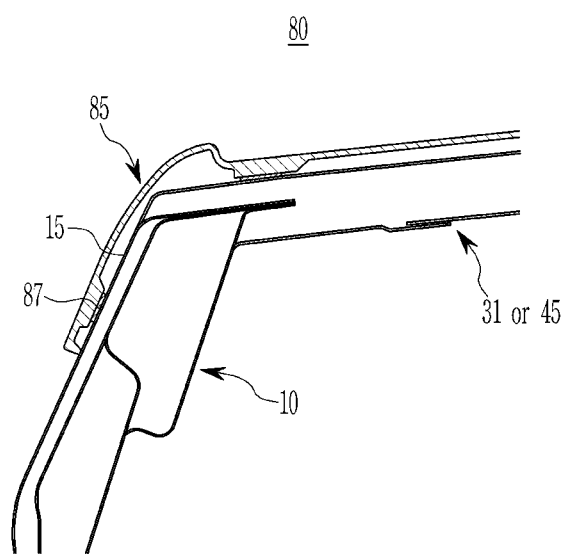
Figure 15B:
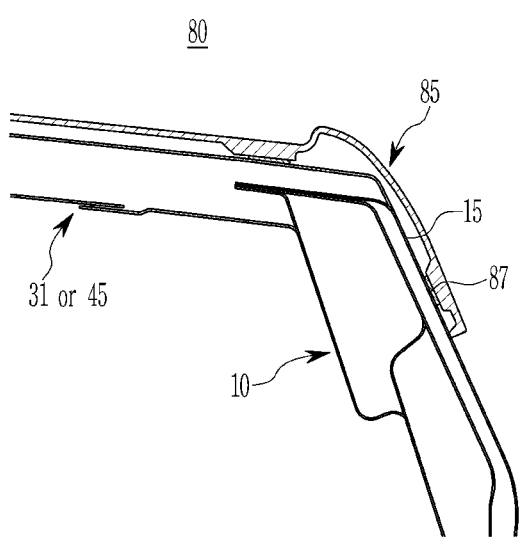

As shown in FIGS. 15A and 15B, the ninth bonding part 85 may be bonded to each roof side 15 of the side structures 10. Further, the ninth bonding part 85 may be bonded to the outer surface of each roof side 15 along the vehicle body front-rear direction through the adhesive 87.

Further, as shown in FIG. 14A, the rear roof panel 80 of the plastic composite material as described above is engaged at the second center roof rail 45 by a bolt 88 and a nut 89 in a mechanical bonding method.

Further, as shown in FIG. 14B, the rear roof panel 80 of the plastic composite material is engaged at the rear roof rail 31 by the bolt 88 and the nut 89 in the mechanical bonding method.

Hereinafter, an operation of the vehicle roof structure 100 according to an embodiment of the present invention configured as described above will be described in detail with reference to FIG. 1 through FIG. 15B.

First, the roof panel assembly mounted at the upper portions of each of the side structures 10 of the vehicle body 1 includes the center roof panel 50 made of the steel material, the front roof panel 70 made of the plastic composite material, and the rear roof panel 80 made of the plastic composite material.

In the vehicle roof structure 100 according to an embodiment of the present invention, the center roof panel 50 of the steel material is coupled to the center roof rail assembly 41 and each roof side 15 of the side structures 10 in a welding manner.

Here, the center roof panel 50 is coupled to the first center roof rail 43 and the second center roof rail 45 disposed in the vehicle width direction and to the third center roof rail 47 disposed in the vehicle body front-rear direction. A front end portion of the center roof panel 50 is bonded to the upper surface of the first center roof rail 43 along the vehicle width direction. A rear end portion of the center roof panel 50 is bonded to the upper surface of the second center roof rail 45 along the vehicle width direction. Further, both edges of the center roof panel 50 along the vehicle width direction are bonded to each roof side 15 of the center portion 10c of each of the side structures 10 along the vehicle body front-rear direction.

In the vehicle roof structure 100 according to an embodiment of the present invention, the front roof panel 70 of the plastic composite material is bonded to the front roof rail 21, the first center roof rail 43, and each roof side 15 of the side structures 10 in an adhesive manner and in a mechanical manner.

Here, the front end portion of the front roof panel 70 is bonded to the upper surface of the front roof rail 21 along the vehicle width direction. The rear end portion of the front roof panel 70 is bonded to the front end portion of the center roof panel 50 along the vehicle width direction. Further, both edges of the front roof panel 70 along the vehicle width direction are bonded to each roof side 15 of the front portion b0a of each of the side structures 10 along the vehicle body front-rear direction.

Furthermore, the front end portion of the center roof panel 50 bonded to the upper surface of the first center roof rail 43 and the first center roof rail 43 support the rear end portion of the front roof panel 70.

In the vehicle roof structure 100 according to an embodiment of the present invention, the rear roof panel 80 of the plastic composite material is bonded to the rear roof rail 31, the second center roof rail 45, and each roof side 15 of the side structures 10 in an adhesive manner and in a mechanical manner.

Here, the front end portion of the rear roof panel 80 is bonded to the rear end portion of the center roof panel 50 along the vehicle width direction. The rear end portion of the rear roof panel 80 is bonded to the upper surface of the rear roof rail 31 along the vehicle width direction. Further, both edges of the rear roof panel 80 along the vehicle width direction are bonded to each roof side 15 of the rear portion 10b of each of the both side structures 10 along the vehicle body front-rear direction.

Furthermore, the rear end portion of the center roof panel 50 bonded to the upper surface of the second center roof rail 45 and the second center roof rail 45 support the front end portion of the front roof panel 70.

The vehicle roof structure 100 according to an embodiment of the present invention as described so far may reduce a weight of the vehicle body 1 by configuring the large area roof panel assembly, which is applied to the vehicle body 1 of the PBV of the one box design, with the center roof panel 50 of the steel material, the front roof panel 70 of the plastic composite material, and the rear roof panel 80 of the plastic composite material.

In addition, in the vehicle roof structure 100 according to an embodiment of the present invention, the center roof panel 50 of the steel material may be coupled to the center roof rail assembly 41, and the center roof panel 50 may support the front roof panel 70 of the plastic composite material and the rear roof panel 80 of the plastic composite material so that an overall rigidity of the vehicle body 1 is secured.

Furthermore, the vehicle roof structure 100 according to an embodiment of the present invention is different from the conventional art in which an entire large area roof panel assembly is manufactured by press molding of a steel material so that the embodiment of the present invention reduces the investment cost and the development period of the mold for manufacturing the roof panel assembly.

Furthermore, in the vehicle body 1 including the vehicle roof structure 100 according to an embodiment of the present invention, the front roof panel 70 of the plastic composite material and the rear roof panel 80 of the plastic composite material may be applied to the front module and the rear module that are the fixing parts and are commonly applied to the various types of the PBV.

Further, in the vehicle body 1 including the vehicle roof structure 100 according to an embodiment of the present invention, the center roof panel 50 of the steel material may be applied to the center module that is the deformable part and is structurally deformed according to the various service concepts of the PBV.

Therefore, the vehicle roof structure 100 according to an embodiment of the present invention may variously modify a size and a shape of the center roof panel 50 included in the PBV of the one box design according to the service concept the of the PBV so that the embodiment of the present invention promotes various scalability of the service concept provided to the user.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A vehicle roof structure comprising:
a front roof rail and a rear roof rail coupled to a front portion and a rear portion of side structures, respectively, the side structures being disposed along opposite sides of a vehicle body in a vehicle width direction of the vehicle body;
a center roof rail assembly disposed between the front roof rail and the rear roof rail and coupled to the side structures;
a front roof panel comprising a first plastic composite material and coupled to the front roof rail, the center roof rail assembly, and the front portion of each of the side structures;
a rear roof panel comprising a second plastic composite material and coupled to the rear roof rail, the center roof rail assembly, and the rear portion of each of the side structures; and
a center roof panel comprising a steel material and coupled to the center roof rail assembly and a center portion of each of the side structures.

2. The vehicle roof structure of claim 1, wherein the center roof rail assembly comprises:
a first center roof rail connected to roof sides of the side structures at a distance from the front roof rail in the vehicle width direction;
a second center roof rail connected to the roof sides of the side structures at a distance from the rear roof rail in the vehicle width direction; and
a third center roof rail connected to the first center roof rail and the second center roof rail in a vehicle body front-rear direction.

3. The vehicle roof structure of claim 2, wherein the center roof panel comprises:
a first bonding part at a front end portion of the center roof panel and bonded to the first center roof rail; and
a second bonding part at a rear end portion of the center roof panel and bonded to the second center roof rail.

4. The vehicle roof structure of claim 3, wherein:
a front end portion of the front roof panel is bonded to the front roof rail and a rear end portion of the front roof panel is bonded to the first bonding part; and
a front end portion of the rear roof panel is bonded to the second bonding part and a rear end portion of the rear roof panel is bonded to the rear roof rail.

5. The vehicle roof structure of claim 2, wherein:
the front roof panel is coupled to the front roof rail and the first center roof rail by a first bolt and a first nut; and
the rear roof panel is coupled to the rear roof rail and the second center roof rail by a second bolt and a second nut.

6. The vehicle roof structure of claim 2, wherein both edges of the center roof panel along the vehicle width direction are bonded to an outer surface of each of the roof sides, respectively.

7. The vehicle roof structure of claim 2, wherein a space portion is defined between each of the roof sides of the side structures and the third center roof rail.

8. The vehicle roof structure of claim 7, wherein the center roof panel comprises an opening portion connected to the space portion.

9. The vehicle roof structure of claim 2, wherein the center roof panel comprises a forming part formed downward along the vehicle body front-rear direction and bonded to the third center roof rail.

10. The vehicle roof structure of claim 2, wherein both end portions of the first center roof rail are connected to an upper portion of a door supporting pillar at the front portion of each of the side structures.

11. The vehicle roof structure of claim 2, wherein both end portions of the second center roof rail are connected to an upper portion of a door supporting pillar at the rear portion of each of the side structures.

12. A vehicle roof structure comprising:
a front roof rail and a rear roof rail coupled to a front portion and a rear portion of side structures, respectively, the side structures being disposed along opposite sides of a vehicle body in a vehicle width direction of the vehicle body;
a center roof rail assembly disposed between the front roof rail and the rear roof rail and coupled to the side structures;
a front roof panel comprising a first plastic composite material and coupled to the front roof rail, the center roof rail assembly, and the front portion of each of the side structures;
a rear roof panel comprising a second plastic composite material and coupled to the rear roof rail, the center roof rail assembly, and the rear portion of each of the side structures; and
a center roof panel comprising a steel material and coupled to the center roof rail assembly and a center portion of each of the side structures;
wherein the center roof rail assembly comprises:
a first center roof rail connected to roof sides of the side structures at a distance from the front roof rail in the vehicle width direction;
a second center roof rail connected to the roof sides of the side structures at a distance from the rear roof rail in the vehicle width direction; and
a third center roof rail connected to the first center roof rail and the second center roof rail in a vehicle body front-rear direction; and
wherein both edges of the front roof panel along the vehicle width direction and both edges of the rear roof panel along the vehicle width direction are bonded to an outer surface of each of the roof sides.

13. A vehicle body comprising:
an underbody;
an upper body coupled to the underbody, the upper body comprising side structures disposed along opposite sides of the vehicle body in a vehicle width direction of the vehicle body and extending in a vehicle body front-rear direction;
a front roof rail coupled to a front portion of the side structures;
a rear roof rail coupled to a rear portion of the side structures;
a center roof rail assembly disposed between the front roof rail and the rear roof rail and coupled to the side structures;
a front roof panel comprising a first plastic composite material and coupled to the front roof rail, the center roof rail assembly, and the front portion of each of the side structures;
a rear roof panel comprising a second plastic composite material and coupled to the rear roof rail, the center roof rail assembly, and the rear portion of each of the side structures; and
a center roof panel comprising a steel material and coupled to the center roof rail assembly and a center portion of each of the side structures.

14. The vehicle body of claim 13, wherein the center roof rail assembly comprises:
a first center roof rail connected to roof sides of the side structures at a distance from the front roof rail in the vehicle width direction;
a second center roof rail connected to the roof sides of the side structures at a distance from the rear roof rail in the vehicle width direction; and
a third center roof rail connected to the first center roof rail and the second center roof rail in the vehicle body front-rear direction.

15. The vehicle body of claim 14, wherein the center roof panel comprises:
a first bonding part at a front end portion of the center roof panel and bonded to the first center roof rail; and
a second bonding part at a rear end portion of the center roof panel and bonded to the second center roof rail.

16. The vehicle body of claim 15, wherein:
a front end portion of the front roof panel is bonded to the front roof rail and a rear end portion of the front roof panel is bonded to the first bonding part; and
a front end portion of the rear roof panel is bonded to the second bonding part and a rear end portion of the rear roof panel is bonded to the rear roof rail.

17. The vehicle body of claim 14, wherein:
the front roof panel is coupled to the front roof rail and the first center roof rail by a first bolt and a first nut; and
the rear roof panel is coupled to the rear roof rail and the second center roof rail by a second bolt and a second nut.

18. The vehicle body of claim 14, wherein both edges of the center roof panel along the vehicle width direction are bonded to an outer surface of each of the roof sides, respectively.

19. The vehicle body of claim 14, wherein:
a space portion is defined between each of the roof sides of the side structures and the third center roof rail; and
the center roof panel comprises an opening portion connected to the space portion.

20. The vehicle body of claim 14, wherein:
both end portions of the first center roof rail are connected to an upper portion of a first door supporting pillar at the front portion of each of the side structures; and
both end portions of the second center roof rail are connected to an upper portion of a second door supporting pillar at the rear portion of each of the side structures.

* * * * *